United States Patent [19]

Pretty

[11] 4,122,578
[45] Oct. 31, 1978

[54] WINDOW WIPER ASSEMBLY
[75] Inventor: John E. Pretty, Brentwood, England
[73] Assignee: Ford Motor Company, Dearborn, Mich.
[21] Appl. No.: 827,401
[22] Filed: Aug. 24, 1977
[30] Foreign Application Priority Data
Nov. 30, 1976 [GB] United Kingdom .............. 49804/76
[51] Int. Cl.² ........................... B60S 1/32; B60S 1/40
[52] U.S. Cl. ................................................. 15/250.23
[58] Field of Search ........... 15/250.21, 250.23, 250.34, 15/250.35; 74/53, 70–80

[56] References Cited
U.S. PATENT DOCUMENTS
1,134,861   4/1915   Johnson ...................... 15/250.23 X
FOREIGN PATENT DOCUMENTS
1,105,743   4/1961   Fed. Rep. of Germany ........ 15/250.21
2,415,181  10/1975   Fed. Rep. of Germany ........ 15/250.23
  392,634   5/1933   United Kingdom ................. 15/250.23
1,389,286   4/1975   United Kingdom ................. 15/250.21

Primary Examiner—Peter Feldman
Attorney, Agent, or Firm—John J. Roethel; Keith L. Zerschling

[57] ABSTRACT

A linkage for controlling the motion of a member reciprocated in substantially a circular arc. The linkage comprises a shaft rotatable in alternate directions between first and second positions, an arm secured to the shaft for rotation therewith and a member pivotally connected to the arm at a first location spaced from the shaft. A radius arm is mounted on the shaft for rotations relative thereto, the radius arm having a sliding connection with the member at a second location spaced from the shaft and from the first location. A stop means limits movement of the radius arm to an arc less than the arc between the first and second positions of the shaft.

The linkage is particularly adapted to control the motion of a wiper blade in a wiper assembly for the rear window of a vehicle.

5 Claims, 1 Drawing Figure

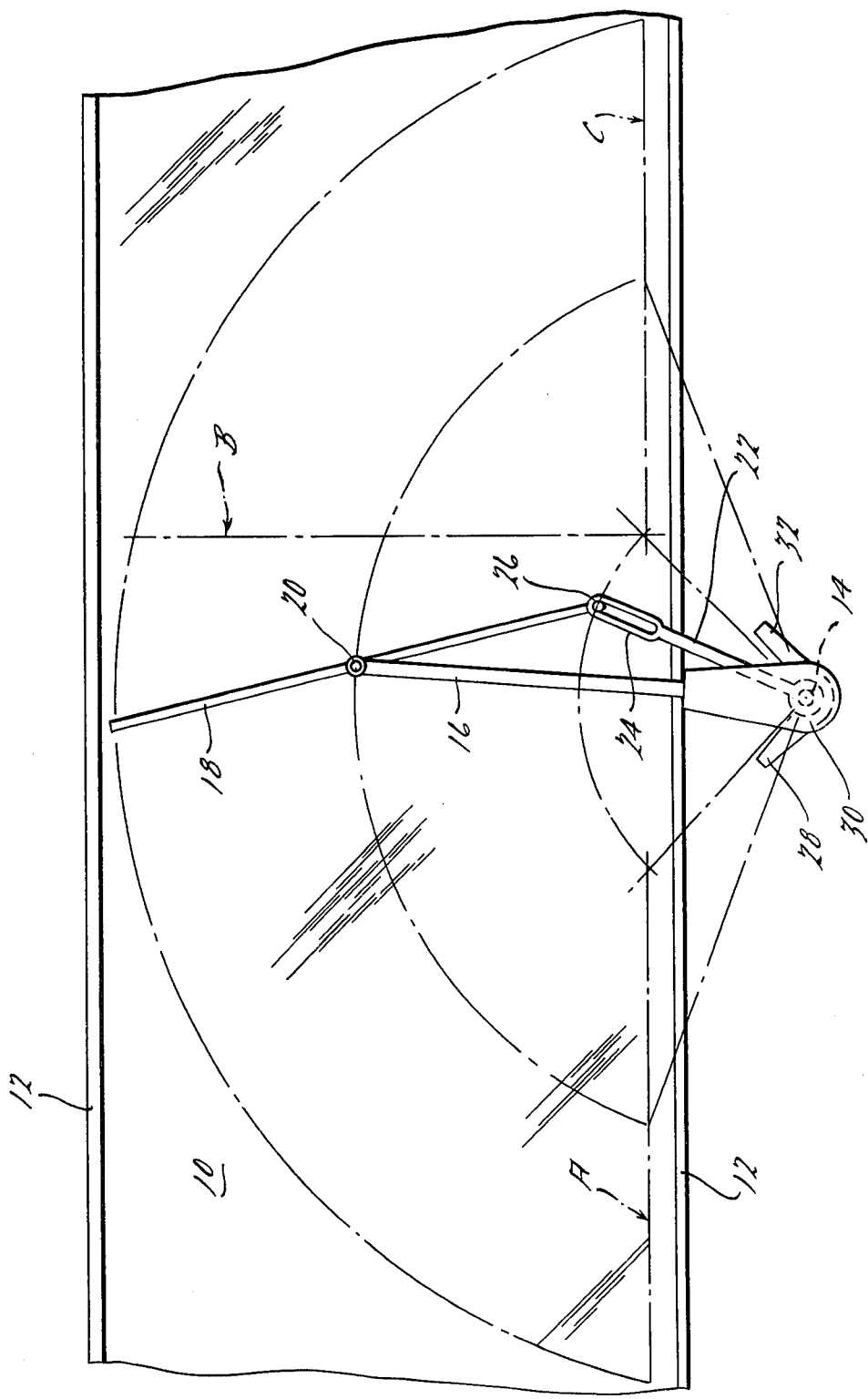

WINDOW WIPER ASSEMBLY

BACKGROUND OF THE INVENTION

This invention relates to a linkage for controlling the motion of a member reciprocated in substantially a circular arc, and is particularly but not exclusively of use in a wiper assembly for the rear window of a vehicle.

It is of course known to provide a wiper for the rear window of estate-car or station wagon type vehicles. Because of cost and space limitations it is usual to provide a single wiper arm mounted to a shaft positioned some distance below the bottom edge of the window. This leads to a wipe pattern which leaves an unwiped portion in the bottom corner of the window on the side opposite the wiper blade parking position. It is possible to overcome this by means of a parallelogram linkage in place of a simple wiper arm, but the added complexity and expense is undesirably high; see U.S. Pat. No. 2,550,094 issued Apr. 24, 1951 to T. J. Smulski for "Wiper Blade Control Linkage."

An object of the present invention is therefore to provide a relatively simple and cheap linkage which may be used in this and other applications.

SUMMARY OF THE INVENTION

The invention accordingly provides a linkage for controlling the motion of a member reciprocated in substantially a circular arc, comprising a shaft adapted to be rotated in alternate directions between first and second positions, an arm secured to the shaft for rotation therewith, a member pivotally connected to the arm at a first location spaced from the shaft, a radius arm mounted on the shaft for rotation relative thereto, a sliding connection between the radius arm and said member at a second location spaced from the shaft and from said first location, and stop means limiting movement of the radius arm to an arc less than the arc between said first and second positions of the shaft.

DESCRIPTION OF THE DRAWINGS

An embodiment of the invention will now be described, by way of example, with reference to the accompanying drawing which is an elevation of a wiper assembly on a vehicle window.

DETAILED DESCRIPTION OF THE INVENTION

A vehicle window 10 is fixed in a trim strip partially shown at 12. A shaft 14 positioned in a body panel (now shown) below the window 10 is drivingly connected to a motor and gearbox (not shown) of known type for rotation in alternate directions. A wiper arm 16 is secured to the shaft 14 at one end, and at its other end mounts a wiper blade 18 by means of a pivot 20. It will be understood that, apart from the pivotal connection, the wiper arm and blade are of conventional construction and may include, for example, a spring bearing on the arm 16 to bias the blade 18 against the window 10.

A radius arm 22 has one end freely rotatable on the shaft 14, and its other end is provided with a slot 24. A pin 26 secured to the inner end of the wiper blade 18 engages the slot 24.

The parked position of the wiper blade 18 is indicated at A. In this position, the radius arm 22 abuts a stop 28 formed on a casting 30 secured to the body panel. When the motor is brought into operation, the wiper arm 16, blade 18 and radius arm 22 are rotated through the position shown in full to the position indicated at B, at which point the radius arm 22 abuts a second stop 32 on the casting 30. Rotation of the shaft 14 continues, causing the pin 26 to slide downwardly in the slot 24 until the wiper arm 16 is above the radius arm 22, and then upwardly until the position indicated at C is reached. At this point, the shaft rotation is reversed in the known manner, and the action is reversed to return the blade 18 to position A.

Modifications of the embodiment described are possible. For example, a pin on the radius arm could engage a slot in the wiper blade. The sliding connection between the radius arm and blade need not be at the radially inner end of the blade, although this is preferred as requiring least material.

It is to be understood this invention is not limited to the exact construction illustrated and described above, but that various changes and modifications may be made without departing from the spirit and scope of the invention as defined by the following claims.

I claim:

1. A linkage for controlling the motion of a member reciprocated in substantially a circular arc, comprising:
    a shaft rotatable in alternate directions between first and second positions,
    a wiper arm secured to the shaft for rotation therewith,
    a wiper blade assembly pivotally connected intermediate its ends to the wiper arm at a fixed first location spaced from the shaft,
    a radius arm mounted on the shaft for rotations relative thereto,
    a sliding connection between the radius arm and said wiper blade assembly at a second location spaced from the shaft and from said fixed first location,
    and stop means limiting movement of the radius arm to an arc less than the arc between said first and second positions of the shaft.

2. A linkage according to claim 1, in which:
    said sliding connection comprises a pin on said wiper blade assembly engaging a slot in the radius arm.

3. A linkage according to claim 2, in which:
    said wiper blade assembly is elongated and the pin is at the end thereof nearest the shaft.

4. A linkage according to claim 3, in which:
    the fixed first location is substantially at the center of the wiper blade assembly.

5. In a vehicle window wiper assembly having a wiper blade reciprocable in substantially a circular arc,
    a linkage for controlling the motion of the wiper blade, comprising:
    a shaft rotatable in alternate directions between first and second positions,
    an arm secured to the shaft for rotation therewith,
    a wiper blade pivotally connected to the arm at a fixed first location spaced from the shaft, a radius arm mounted on the shaft for rotations relative thereto, a sliding connection between the radius arm and the wiper blade at a second location spaced from the shaft and from the first location, and stop means limiting movement of the radius arm to an arc less than the arc between the first and second positions of the shaft.

* * * * *